US006535507B1

(12) United States Patent
Li et al.

(10) Patent No.: US 6,535,507 B1
(45) Date of Patent: Mar. 18, 2003

(54) METHOD OF ADDRESS RESOLUTION FOR THE TRANSFER OF SYNCHRONOUS TRANSFER MODE CALLS THROUGH MULTIPLE DOMAINS IN A BROADBAND DATA NETWORK

(75) Inventors: Li Li, Kanata (CA); Kenneth Gary Hayward, Kanada (CA); Todd Douglas Morris, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/110,244

(22) Filed: Jul. 6, 1998

(51) Int. Cl.[7] .......................... H04L 12/64; H04L 12/66
(52) U.S. Cl. .................... 370/356; 370/356; 370/395.1; 370/395.52; 370/395.54
(58) Field of Search ................................. 370/352–354, 370/356, 389, 397, 399, 400, 401, 409, 410, 395.1, 395.2, 395.3, 395.5, 395.52, 395.54, 395.6; 379/900

(56) References Cited

U.S. PATENT DOCUMENTS

| 5,568,475 A | | 10/1996 | Doshi et al. ................ 370/58.2 |
| 5,774,465 A | * | 6/1998 | Lau et al. ..................... 370/397 |
| 5,835,710 A | * | 11/1998 | Nagami et al. .............. 709/250 |
| 5,991,301 A | * | 11/1999 | Christie ....................... 370/395 |
| 6,016,319 A | * | 1/2000 | Kshirsagar et al. .......... 370/410 |
| 6,069,890 A | * | 5/2000 | White et al. ................. 370/352 |
| 6,130,889 A | * | 10/2000 | Feldman et al. ............ 370/397 |
| 6,157,636 A | * | 12/2000 | Voit et al. .................... 370/353 |
| 6,172,981 B1 | * | 1/2001 | Cox et al. ............... 370/395.31 |
| 6,243,383 B1 | * | 6/2001 | Li et al. .................... 370/395.6 |
| 6,195,714 B1 | * | 7/2001 | Li et al. ....................... 710/31 |
| 6,256,292 B1 | * | 7/2001 | Ellis et al. ................... 370/227 |
| 6,262,992 B1 | * | 7/2001 | Nelson et al. .............. 370/426 |

* cited by examiner

Primary Examiner—Hassan Kizou
Assistant Examiner—Ahmed Elallam
(74) Attorney, Agent, or Firm—Max R. Wood; Ogilvy Renault

(57) ABSTRACT

A method of address resolution for the transfer of voice and voice data calls through multiple domains in a broadband data network is described. The implementation of broadband data networks as transport backbones for voice and voice data calls requires address resolution to determine the destination node for each call. Because of the projected frequency at which new access peripherals will be added to such broadband data networks, manual maintenance of translation tables is impractical. The invention therefore provides an automated method for address resolution which permits voice interface control units associated with the broadband data network nodes to automatically maintain the required translation tables. Next-hop resolution routing tables may be maintained at every node or only at nodes designated as signaling gateways between broadband data network domains. If the broadband data network is an ATM network, switched virtual circuits are set up in reverse from ATM destination nodes in order to reduce call admission and setup time. The advantage is automated maintenance of translation tables which may be tailored to meet the operating policy of network managers that control respective domains.

39 Claims, 8 Drawing Sheets

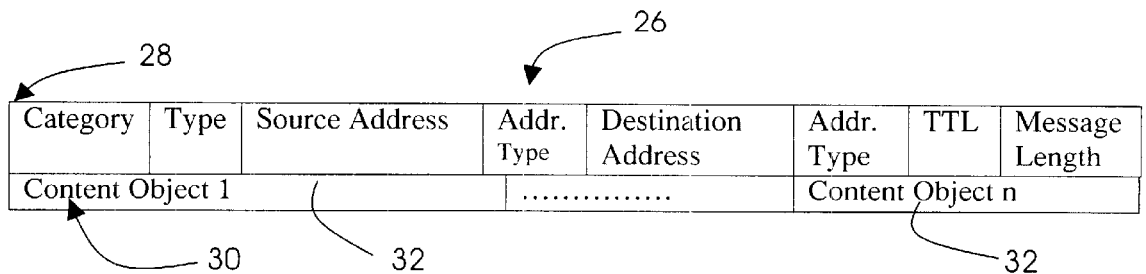

FIG. 2a

| Category | Type | Purpose | Content |
|---|---|---|---|
| REQUEST | 1 | Intra-domain Initialization – to populate all nodes in the same domain with DNs served by requesting node; RESPONSE is mandatory | REQUEST{type=1; seq.#; source=A1, P1; destination = A3, P3; TTL=1; local DN list (819-212 ....819-997)} |
| RESPONSE | 1 | Intra-domain Initialization – to populate requesting node with DNs served by a node receiving type 1 request | RESPONSE{type=1; seq.#; source=A6, P6; destination=A1, P1; local DN list (613-230....613-780)} |
| REQUEST | 2 | Intra-domain Update – to notify neighbor nodes of DN changes or flood translation entries; RESPONSE is optional | REQUEST{type=2; seq.#; source=A1, P1; destination=Ax, Px; TTL=1; local DN list (819-210 ....819-953)} OR REQUEST{type=2; seq.#; source=A1, P1; destination=A3, P3; TTL=1; translation entries(613-230, P6, A6...613-780, P6, A6)} |
| RESPONSE | 2 | Intra-domain Update – to acknowledge type 2 REQUEST, with or without content | RESPONSE{type=2; seq.#; source=A6, P6; destination=A1, P1} |
| REQUEST | 3 | Translation entry query for information respecting the identity of a node that serves a particular DN    OR Inter-domain REQUEST for gateway translation entries ("[...]" indicates optional content) | REQUEST{type=3; seq.#; source=A1, P1; destination=A2, P2; TTL=5; [local DN list (819-210 ....819-953)]; translation entry query (DN=514-833); PC Stack=P1}    OR REQUEST{type=3; seq.#; (source=A4, P4); destination= Ax, Px; TTL=4; group (A1, P1; domain DN list (514-112 ....819-997); PC Stack=P4} |

FIG. 2b

| Category | Type | Purpose | Content |
|---|---|---|---|
| RESPONSE | 3 | Translation entry query RESPONSE for providing information respecting the identity of a node that serves a particular DN  OR Inter-domain RESPONSE for gateway translation entries ("[...]" indicates optional content) | RESPONSE{type=3; seq.#; source=A5, P5; destination=A1, P1; [local DN list (514-210 ....514-711)]; translation query entry (DN=514-833; A5, P5); Original PC Stack= P1,P2,P5; PC Stack=P1,P2}  OR RESPONSE{type=3; seq.#; source=C4, P44; dest=A4,P4; group (C4, P44; domain DN list (416-210 ....519-953); Original PC Stack= P4,P8,P12,P44; PC Stack= P4,P8,P12} |
| REQUEST | 4 | Inter-domain REQUEST to notify other gateways of changes to a domain DN list, response is expected but content is optional | REQUEST{type=4; seq.#; (source=A4, P4); destination= A2, P2; TTL=4; group(A4, P4; domain DN list (514-112 ....819-997)]; PC Stack=P4} |
| RESPONSE | 4 | Inter-domain RESPONSE to type 4 REQUEST message, | RESPONSE{type=4; seq.#; source=C4, P44; dest=A4,P4; Original PC Stack= P4,P2,P5,P44; PC Stack= P4,P2,P5} |
| REQUEST | 5 | Next-hop routing REQUEST with reverse SVC setup to obtain a translation entry for the DN, and to concurrently set up call path from the destination node to the originating node | REQUEST{type=5; seq.#; source=A4, P4; destination=A3, P3; TTL=6; translation entries query(DN=212-123-1234), PC Stack=P1; SVC Request (traffic contract, VCCI=x1)} |
| RESPONSE | 5 | RESPONSE to next-hop routing REQUEST to provide translation entry information for the DN | RESPONSE{type=5; seq.#; source=C2, P42; destination= A4,P4; translation entry query (DN=212-123, PC=P42, ASEA=AC2); traffic contract, VCCI=x1; PC Stack=P4, P3} |
| REQUEST | 6 | Next-hop routing REQUEST with reverse SVC setup, without translation entry query | REQUEST{type=6; seq.#; source=A4, P4; destination=D3, P3; TTL=6; PC Stack=P4; SVC Request (traffic contract, VCCI=x1 ...)} |
| RESPONSE | 6 | RESPONSE to reverse SVC setup REQUEST, without translation entry information | RESPONSE{type=6; seq.#; source=D3, P3; destination=A4, P4; PC Stack=P4,P6,P44; SVC Request (traffic contract, VCCI=x1)} |

FIG. 2c

METHOD OF ADDRESS RESOLUTION FOR THE TRANSFER OF SYNCHRONOUS TRANSFER MODE CALLS THROUGH MULTIPLE DOMAINS IN A BROADBAND DATA NETWORK

TECHNICAL FIELD

This invention relates generally to synchronous transfer mode (STM) call completions and, in particular, to the completion of calls which originate and terminate in an STM network but at least a portion of the call connection is completed using a broadband data network, for example an asynchronous transfer mode (ATM) network or an Internet Protocol (IP) network.

BACKGROUND OF THE INVENTION

Multi-service broadband networks built using ATM or IP protocols are gaining acceptance as the preferred transport backbone for STM service providers because they permit the service providers to consolidate their voice and data traffic on a single multi-service facility. Consequently, the use or the desire to use ATM/IP networks as transport backbones for STM calls is rapidly increasing. As new facilities are added to ATM/IP networks for the admission of STM calls, a problem arises respecting address resolution to determine an appropriate broadband data destination node for servicing each call admission request.

Call setup and control in the public switched telephone network (PSTN) is generally effected using an out-of-band signaling network known as a common channel signaling network. Most of the North American PSTN is equipped to operate with a common channel signaling protocol called Signaling System 7 (SS7). ATM networks, for example, use a different signaling protocol in which signaling messages are transported through the network in cells like those used for carrying payload data. The signaling systems of the PSTN and ATM networks are therefore incompatible and STM calls cannot be transferred directly to or from an ATM network. Although it is possible to adapt an ATM network to operate under the control of a common channel signaling network, as taught in U.S. Pat. No. 5,568,475 entitled "ATM NETWORK ARCHITECTURE EMPLOYING A COMMON CHANNEL SIGNALING NETWORK", which issued on Oct. 22, 1996 to Doshi et al, it is less expensive and preferable to permit the ATM multi-service carrier network to operate autonomously with its native signaling system. This minimizes expense while enabling efficient use of ATM network resources. The same applies to the use of multi-service IP networks which currently run on a dynamic routing system for the purpose of data services, and one not adapted to support signaling.

In the STM network, time division multiplex switches are arranged in a hierarchy which minimizes address encoding and permits calls to be completed with a minimum of address resolution. A factor which contributes to the efficiency of broadband data networks is that such a switch hierarchy does not exist. While this lack of hierarchy contributes to network efficiency and versatility, it imposes a requirement for address resolution to enable STM calls to be transferred through the ATM network at an acceptable call setup rate. Likewise, an address resolution system is required to enable STM calls to be transferred through an IP network because IP does not support the PSTN numbering system.

There therefore exists a need for a method of address resolution to enable the transfer of STM calls through multiple domains in a broadband data network. There also exists a need for a messaging protocol for called number address resolution in a multiple domain control network adapted to control the transfer of STM calls between STM switches using a broadband data backbone.

SUMMARY OF THE INVENTION

It is an object of the invention to provide a method of address resolution for the transfer of STM calls through a broadband data network which enables automated data fill and maintenance of translation tables to enable address resolution.

It is a further object of the invention to provide a method of address resolution for the transfer of STM calls through multiple domains in a broadband data network in which a switched virtual circuit is set up from a destination node for a call in order to minimize call setup time.

It is yet a further object of the invention to provide a method of address resolution for the transfer of STM calls through multiple domains across a broadband data network in which each domain includes at least one voice gateway node having a control virtual circuit established with a peer voice gateway node in an adjacent domain.

It is a further object of the invention to provide a method in which voice gateway nodes maintain next-hop call resolution routing tables which enable call routing without requiring a complete address mapping table indicating the destination node to serve a dialled number.

It is yet another object of the invention to provide a method of address resolution for the transfer of STM calls through a broadband data network in which all nodes in a domain of the broadband data network maintain a complete map of dialled numbers served by nodes in the domain.

These and other objects of the invention are realized by a method of address resolution for the transfer of synchronous transfer mode (STM) calls through multiple domains across a broadband data network, comprising the steps of: checking a called number translation table at an edge node in the broadband data network which receives an admission request for the call to determine whether an address of a destination node to serve the called number is known; if the address is known, setting up an egress of the call from the broadband network; if the address is not known, formulating a query message at the edge node to determine the address of a destination node that serves the called number; and forwarding the query message to at least one predetermined node in the broadband data network to request a translation of the called number to determine the address of the destination node; and for a predefined number of hops, forwarding the query message to at least one other node if a node receiving the query does not possess information to enable the translation.

In accordance with a further aspect of the invention there is provided a messaging protocol for called number address resolution in a broadband data network adapted to transfer synchronous transfer mode (STM) calls between synchronous transfer mode (STM) switches, comprising: a message header portion that contains fixed length fields for mandatory information common to all messages; and a message content portion that contains a variable number of content objects, each content object including a content type indicator, a length indicator and content data.

The invention therefore provides a method of address resolution and a messaging protocol for address resolution which facilitates the transfer of STM calls through multiple domains in a broadband data network, such as an ATM or an IP network In accordance with the method, the voice edge nodes are preferably organized in domains which consist of a collection of edge nodes in the broadband data network that are equipped to accept STM call admission requests, each edge node being equipped with a voice interface control unit described in applicant's U.S. Pat. No. 6,195,714, entitled SYSTEM FOR TRANSFERRING STM CALLS THROUGH ATM NETWORK BY CONVERTING THE STM CALLS TO ATM AND VICE VERSA AT THE EDGE NODES OF ATM NETWORK. The specification of that application is incorporated herein by reference in its entirety. The collection of edge nodes are logically fully meshed by control virtual circuits for call control and address resolution message forwarding if the broadband network is an ATM network.

In the description of the preferred embodiments of the invention which follows, reference is made principally to ATM networks, which are currently used for STM call transfer. It will be understood by those skilled in the art that the principles described may be applied with minimal revision to IP networks, as will be described below in more detail. Each domain includes at least one gateway switch. A gateway switch is a broadband edge node having a known path to at least one peer gateway in an adjacent domain. Gateway switches serve as voice call control paths between domains and are preferably enabled to maintain address resolution information respecting other domains in the broadband data network. This imposes a hierarchy on the voice edge nodes connected to the broadband data network, although the broadband data network is not aware of the hierarchy and not encumbered by it.

The methods and the messaging protocol in accordance with the invention therefore permit automatic maintenance of routing tables to enable address resolution for STM calls admitted to a broadband data network without imposing non-native signaling protocols on the broadband data network or integrating a common channel signaling network into the broadband data network. Thus, STM traffic can be rapidly and economically transferred to broadband data facilities with a minimum of preparation and consequently a minimum of expense.

In the case of an IP network connectionless service is used for call control and address resolution routing.

BRIEF DESCRIPTION OF THE DRAWINGS

The invention will now be further explained by way of example only and with reference to the following drawings wherein:

FIG. 2a shows a preferred structure for message signal units for a messaging protocol in accordance with the invention;

FIGS. 2b and 2c show a table illustrating a preferred message categories, types and the purpose and content of each message type using the messaging protocol for address resolution in accordance with the invention;

DETAILED DESCRIPTION OF THE PREFERRED EMBODIMENT

This invention relates to the organization of multi-service ATM networks used as a transport backbone for voice and voice data calls which originate and terminate in a switched telephone network. In accordance with the invention, edge node with voice interfaces in multi-service ATM networks which serve as backbone transport networks for voice and voice data calls are organized into subunits called domains. Each domain consists of a collection of edge nodes adapted to serve synchronous transfer mode call admission requests, the edge nodes being logically fully meshed by control virtual circuits for call control and address resolution messaging. Messaging may be accomplished using a single virtual circuit, or two independent virtual circuits may be used to isolate call control and address resolution messaging. The invention provides methods and a messaging protocol for called number address resolution across multi-domains over an ATM network. In a preferred method in accordance with the invention, call setup time is reduced by using a technique hereinafter referred to as "reverse switched virtual circuit" (SVC) setup in which an SVC to serve the call is set up from a destination node to an origination node in the ATM network using native ATM SVC setup methods. Cached SVC's may also be used to further improve call setup response. A messaging protocol defines message units which include a message header portion that contains fixed length fields for mandatory information common to all messages and a message content portion that contains a variable number of content objects, each content object including a content type indicator, a length indicator and content data.

Network Architecture

Figure 1:
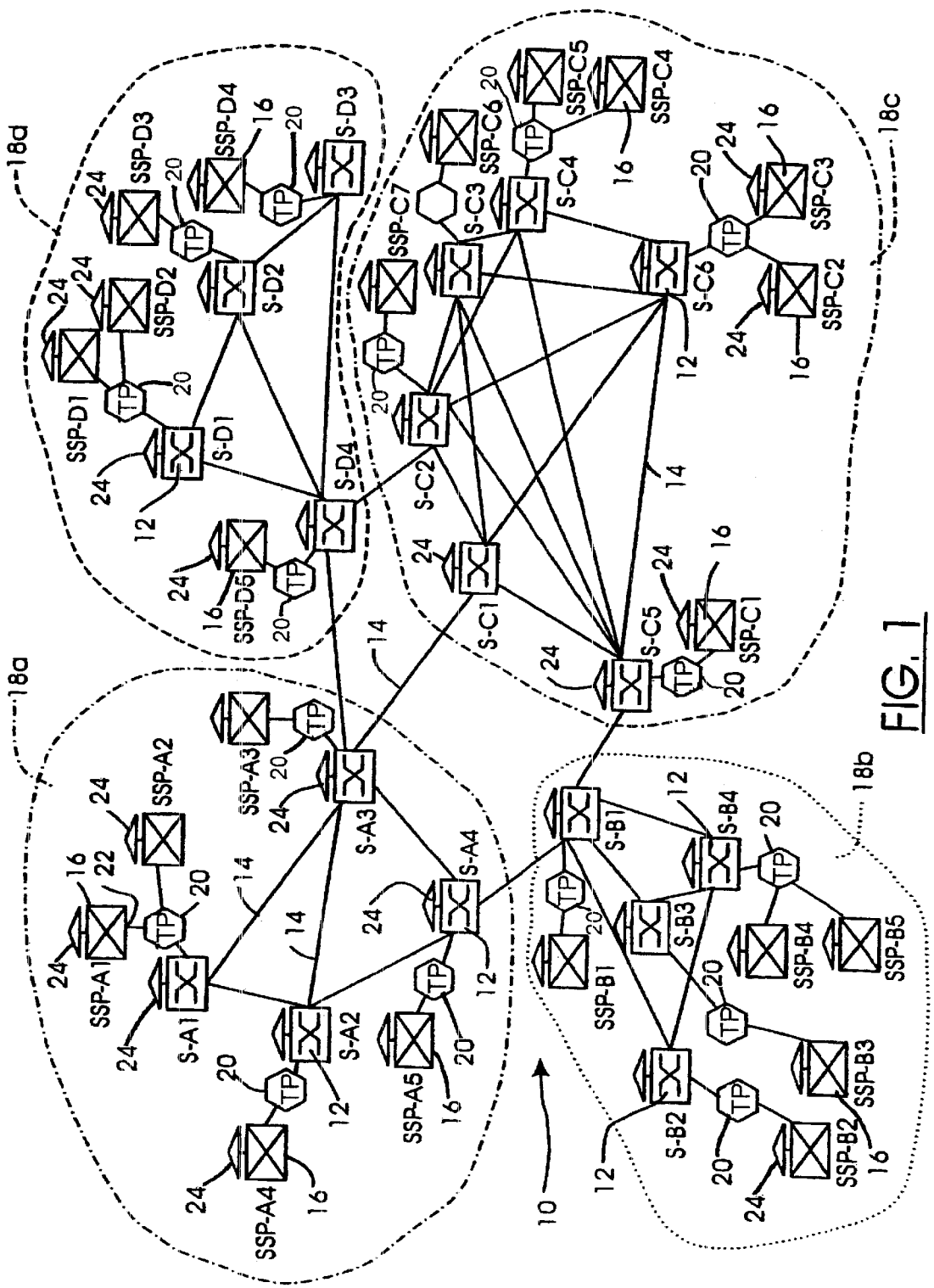
FIG. 1 is a schematic diagram of an ATM network adapted to receive admission requests for synchronous transfer mode calls which originate and terminate in a switched telephone network, the ATM network being organized in a plurality of domains.

FIG. 1 shows a schematic diagram of a multi-service ATM network 10 adapted to serve as a backbone transport network for synchronous transfer mode (STM) calls which originate and terminate in a switched telephone network. The schematic diagram shown in FIG. 1 illustrates the ATM nodes 12 and their transfer links 14. Also illustrated are the time division multiplex switches 16 which originate and terminate voice data calls in switched telephone networks. The lines and trunks associated with the time division multiplex switches 16 are not shown. The time division multiplex switches are labelled as service switching points "SSPs". They are numbered as SSP-A1 through SSP-DS. The ATM nodes 12 are labelled S-A1 through S-D4.

The ATM network 10 shown in FIG. 1 is organized into four domains schematically indicated by broken outlines. The domains 18a through 18d are, as explained above, collections of edge nodes adapted to serve voice and voice data call admission requests. The edge nodes in each domain are logically fully meshed by control virtual circuits for call control and address resolution signaling. Each domain may, for example, be associated with a specific carrier network such as a local exchange carrier (LEC) or an interexchange carrier (IEC). A large carrier network may be organized into several domains in order to facilitate management and address resolution. The multi-service ATM network 10 may be owned and operated by a single service provider or by a plurality of service providers, as is well understood in the art.

As described in applicant's co-pending patent application referenced above, each of the ATM nodes 12 which serves as an edge node in the ATM network for voice and voice data calls is associated with a time division multiplex peripheral 20 (TP), hereinafter referred to as a TDM peripheral 20. The TDM peripheral 20 terminates STM trunks 22 and converts STM data to ATM cells and vice versa. Each ATM node 12 that serves as an edge node to a switched telephone network also includes a voice interface control unit (not illustrated), as also explained in applicant's co-pending patent application. For the purposes of the discussion which follows, it will be assumed that the voice interface control unit is incorporated in a switch control element 24 of the ATM switches 12, and the reference 24 will be used to refer to both the switch control element 24 of the ATM nodes 12 and the voice interface control unit 24.

The voice interface control units 24 of the nodes 12 in each domain 18a–18d may be fully physically meshed as shown in domain 18c or simply logically meshed with control virtual circuits as shown in domain 18d. In domain 18d, ATM nodes S-D1 and S-D3 have a logical direct control virtual circuit that depends on physical transport links which traverse node S-D2. Also, each domain 18a–d includes at least one node designated as a gateway to at least one other domain. Gateway nodes have control virtual circuits established with peer gateway nodes in neighbouring domains. Each domain includes at least one gateway node. For example, domain 18a includes two gateway nodes S-A3 and S-A4. S-A3 has a control virtual circuit established with its peer S-D4. Gateway node S-A4 has a control virtual circuit established with its peer gateway node S-B1 in domain 18b. Domain 18c likewise includes two gateway nodes S-C2 and S-C5 which have control virtual circuits respectively established with gateway node S-D4 in domain 18d and gateway node S-B1 in domain 18b.

It will be understood by those skilled in the art that the domains shown in FIG. 1 are exemplary only and do not necessarily represent the organization or partitioning of a real network.

Messaging Protocol

The method of address resolution in accordance with the invention uses a messaging protocol for dialled number (DN) address resolution in the multiple domain ATM network 10. The messaging protocol defines messaging signal units 26. The preferred structure of the messaging signal unit 26 is shown in FIG. 2a. The messaging signal unit 26 includes a messaging header portion 28 that contains fixed length fields for mandatory information common to all messages, and a message content portion 30 that contains a variable number of content objects 32, each content object 32 includes a content type indicator, a content length indicator and content data. The preferred implementation of the messaging protocol defines six different message types. Each message is further categorized as a REQUEST or a RESPONSE, as will be described below with reference to FIGS. 2b and 2c in which the six types of messages defined by the preferred embodiment of the messaging protocol are described in more detail.

In general, the six types of messages are:

1. Intra-domain initialization used to populate all edge nodes in the same domain with dialled number prefixes (DNs) served by the domain. RESPONSE to type 1 messages is mandatory.

2. Intra-domain updates to advise all edge nodes of a change(s) in DNs served by an edge node in the domain. A RESPONSE is expected but the RESPONSE may be void of content.

3. Translation entry query for information respecting the identity of a node that serves a particular DN. The protocol may permit any node possessing the information to respond to a type 3 message or responses may be restricted to gateway nodes in the domain of the node that serves the DN. Also used for inter-domain translation entry exchanges used to provide gateway nodes with DN routing information. Type 3 messages are sent and received only by gateway nodes.

4. Inter-domain messages to notify nodes in other domains of DN changes or translation entry changes. Response is expected but the response may be void of content.

5. Next-hop routing REQUEST with reverse SVC setup to obtain a translation entry for a specific DN and to concurrently set up a call path from the destination node to the originating node which launched the query. A translation RESPONSE is mandatory if a destination node receives the REQUEST message 6. Next-hop routing request with reverse SVC setup without a translation query. Translation query response data is not included in a RESPONSE to a type 6 message. Alternatively, a type 5 message can be used to request reverse SVC setup without a translation query, in which case a translation query object is not included in the message. If this type 5 message format is used for reverse SVC setup, the type 6 is not required.

The remaining fields in the message header include:

A sequence number generated by the voice interface control unit 24 for the purposes of associating RESPONSES with a REQUEST.

A source node identification in the form of a source node address prefix and a point code assigned to the voice interface control unit 24 which originates the message;

A source node address type to distinguish the addressing system used by the backbone network which may be, for example, ASEA, E.164 or IP addressing;

A destination address which includes the address prefix and the point code of the voice interface control unit 24 of the destination node. For type 3, type 5 and type 6 messages, a destination is unknown and the destination address field is null filled. Those messages are normally forwarded to the domain's gateway node(s), which preferably maintain next-hop resolution routing tables that permit the message to be forwarded toward the destination node, as will be explained below in more detail;

A destination node address type to distinguish the addressing system used by the backbone network which may be, for example, ASEA, E.164 or IP addressing;

A "time to live" (TTL) field which stores an integer assigned for each message type by a network manager at a voice interface control unit 24. When a message is formulated by a voice interface control unit 24 of a node 12, the voice interface control unit 24 inserts the default TTL into the message header. Each recipient node examines the TTL. If the TTL is greater than one, the recipient node may respond to the message or forward the message as appropriate. If the TTL is one, the recipient node may respond to the message but may not forward the message. If the TTL is less than one, the recipient node must discard the message without responding or forwarding. Before forwarding a message, each node subtracts one from the value of the TTL field; and A message length field to indicate a total length of the message, including the message content portion.

As explained above, the message content portion contains a variable number of content objects 32. Each content object 32 includes a content type indicator. In accordance with the preferred embodiment of the invention, defined content types include:

a) local DN list which may be included in any REQUEST or RESPONSE message except type 6 messages to provide other nodes with a list of dialled number prefixes served by the node originating the REQUEST or RESPONSE message;

b) domain DN list which may be included in message types 3, 4, 5 or 6 to provide nodes in another domain with all DNs served by a source domain. The domain DN list does not provide destination addresses associated with the DNs in the list;

c) group list for gateway domain DNs which may be included in message types 3 or 4 to provide gateway nodes in other domains with a list of DNs served by the source domain as well as the point code and the AESA address of the gateway node for the domain. A group content object can be added by each gateway node that receives a type 3 or 4 message;

d) translation query data which is included in a REQUEST message and contains a specific DN for which a translation is required. Translation query data is also included in a RESPONSE message and then contains the ASEA address and point code of a voice interface control unit that serves the DN;

e) point code stack data for which two content type identifiers exist. The point code stack data is used to prevent message loop-back and to provide message path data for domain gateway nodes. The point code stack includes the point code of each voice interface control unit traversed by a REQUEST message. In a RESPONSE message the point code stack data is copied to a new content object hereinafter referred to as the "original PC stack" which is assigned the second content type identifier for PC stack content objects. The point code stack is used to route a RESPONSE message back to the voice interface control unit that originated the REQUEST message and the original point code stack provides a record of the entire path traversed by the REQUEST and RESPONSE messages;

f) SVC setup request data which includes an originating node ASEA prefix and point code as well as a VCCI and other data such as a traffic contract, called party address, QOS, etc. to be used to set up the SVC by the destination node receiving the SVC request; and g) a failure indication may also be included in RESPONSE messages to indicate a failure condition. For example, if an SVC request cannot be satisfied a failure indication will be returned.

The message structure permits the addition of any number of other content object types, as a need arises.

FIGS. 2b and 2c provide examples of the six types of messages for address resolution. As explained above, message type 1 is used for intra-domain initialization to populate all nodes in the same domain 18a–18d with dialled numbers (DNs) served by a node requesting initialization or responding to a type 1 initialization request.

In accordance with protocol, each address resolution message is identified as a REQUEST or a RESPONSE message. The source ASEA address (A1) and the source point code (PC) (P1) of the requesting voice interface control unit 24 is provided to permit responding voice interface control units 24 to address the RESPONSE. The destination address (Ax, Px) shown in FIG. 2b is changed as a copy of the message is sent to each other voice interface control units 24 in the domain. Since the request is for intra-domain initialization, the ATM node 12 incorporates a content object 32 in the message which includes a local DN list. The local DN list includes all dialled number prefixes (DNs) that are served by the requesting voice interface control unit 24. The DNs in the local DN list are truncated to the minimum distinguishing number of digits. For example, if a voice interface control unit 24 serves an entire area code, the DN is truncated to the Number Plan Area (NPA) or the country code and area code for terminations outside North America. If, however, the voice interface control unit 24 serves only selected exchanges of an area code, the NPA plus exchange codes are included in the local DN list.

Address Resolution

Figure 3:
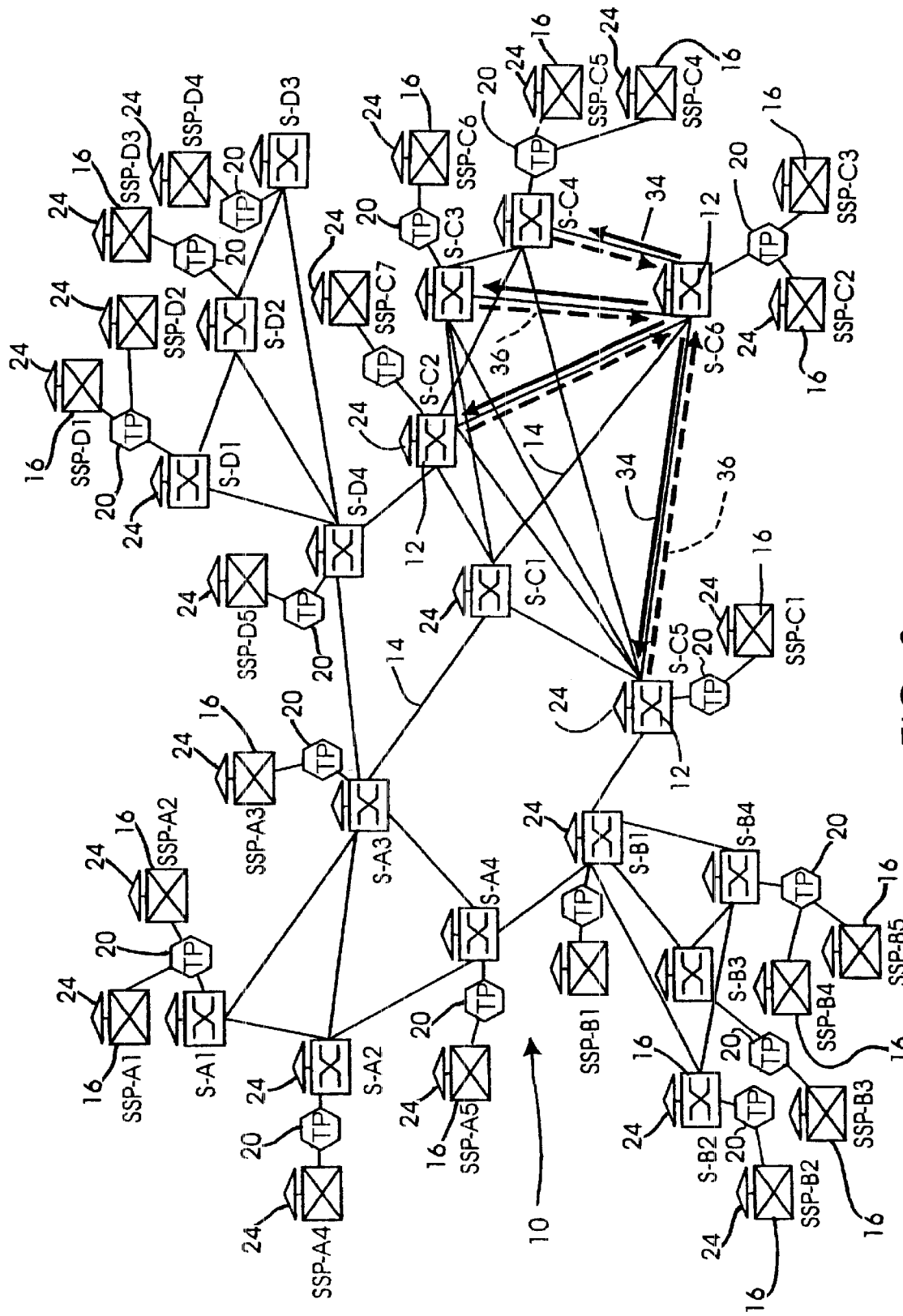
FIG. 3 is a schematic diagram showing an intra-domain initialization procedure in accordance with the protocol shown in FIGS. 2b and 2c.

FIG. 3 is a schematic diagram illustrating initialization messages sent in domain 18c (FIG. 1) when the voice interface control unit associated with ATM edge node S-C6 sends initialization messages of type 1 or type 2. For example, if the edge node S-C6 is being brought into service to connect SSP-C3 or SSP-C2 to the ATM network 10, the associated voice interface control unit 24 is configured with permanent virtual circuits dedicated to control messaging. On initialization, the voice interface control unit 24 of node S-C6 formulates a type 1 REQUEST messages (FIG. 2b) which it sends to each of the nodes in its domain to which it has a configured control virtual circuit. Messages are therefore sent to nodes S-C2; S-C3; S-C4; and S-C5. The message path is indicated by the bold black lines 34 shown in FIG. 3. Each REQUEST message 34 includes the local DN list of node S-C6 to provide peer nodes in the domain with the DNs served by the node S-C6. On receipt of the REQUEST message of type 1, the receiving nodes respond with a RESPONSE message of type 1 (FIG. 2b) in which the responding voice interface control units 24 provide their corresponding local DN list. The RESPONSE message path 36 is indicated by the bold dashed lines in FIG. 3. Type 2 REQUEST messages and type 2 RESPONSE messages are sent by the same paths for updating a change in the local DN list.

Figure 4:
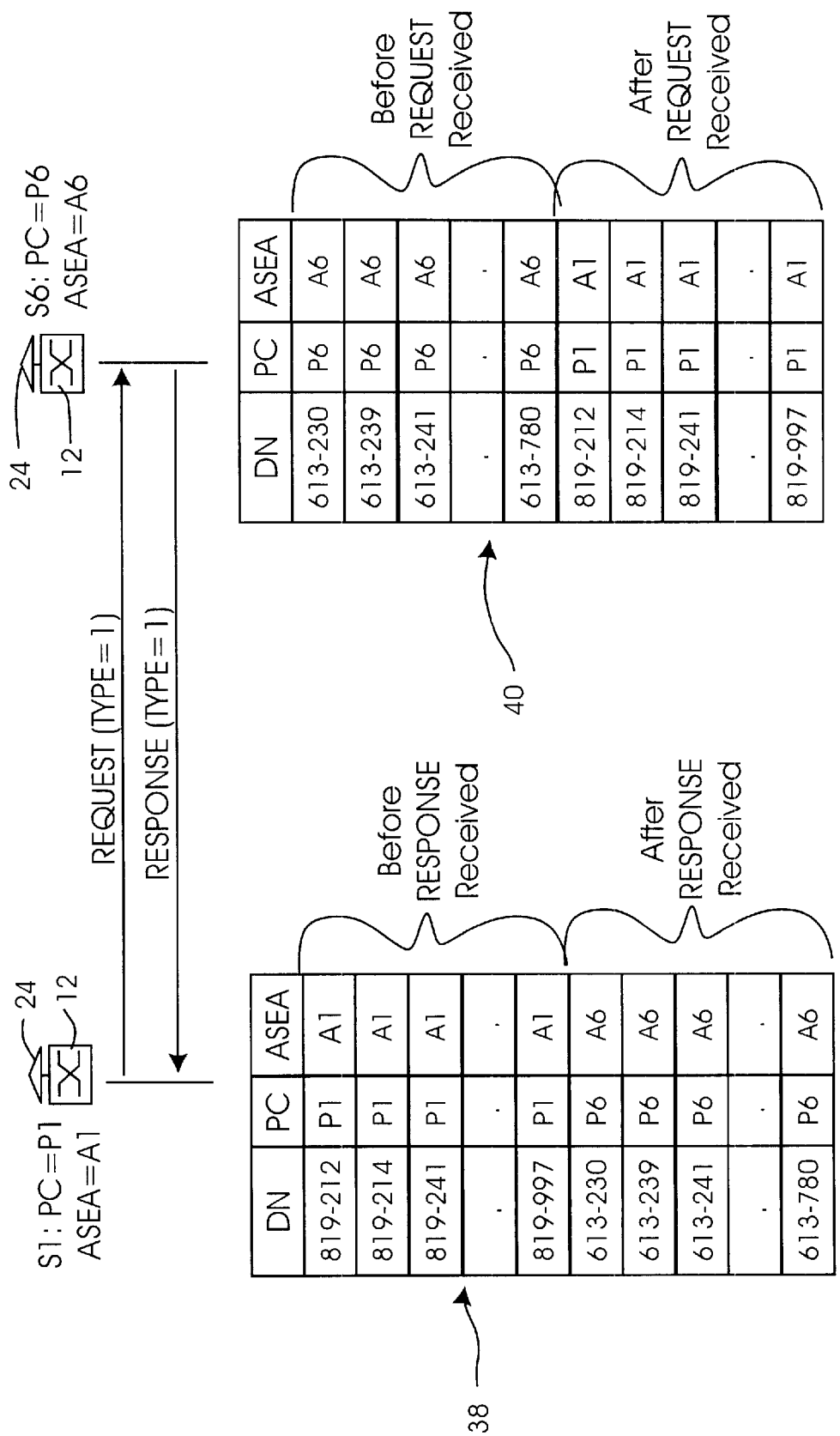
FIG. 4 is a schematic diagram showing the results of the initialization process illustrated in FIG. 3.

FIG. 4 schematically illustrates the effects of a type 1 REQUEST and a type 1 RESPONSE message exchange. As is apparent, when the REQUEST is formulated, the requesting node translation table 38 includes only the local DN list. After receiving the REQUEST, the receiving node "S6" adds the DN list of the requesting node "S1" to its translation table 40 and responds with its local DN list. On receipt of the RESPONSE message, node S1 adds the local DN list of node S6 to its translation table 38 as shown in FIG. 4. Consequently, the voice interface control unit 24 associated with each node 12 in each domain maintains a translation table which includes all DNs served by the domain. Whenever a node administrator changes a translation table or a domain administrator adds a new node or a new voice interface control unit 24 to the domain, the results are flooded to other peers in the domain using type 1 or 2 messages, so that the translation tables are automatically maintained. Therefore, an SVC can be set up immediately by an originating node for any STM call which originates and terminates on SSPs served by ATM nodes 12 within the same domain. This enables rapid intra-domain call processing. Call processing speed may be further improved using switched virtual circuits as described in applicant's co-pending patent application entitled "METHOD AND APPARATUS FOR CACHING SWITCH VIRTUAL CIRCUITS IN AN ATM NETWORK", which was filed on Apr. 2, 1998, and has now issued as U.S. Pat. No. 6,275,493, the specification of which is incorporated herein by reference in its entirety.

Although inter-domain calls may be routed directly, call admission requests will be received by the voice interface control unit 24 associated with DNs served by other domains. The voice interface control units 24 receiving such requests require a mechanism to resolve the address of a destination node which serves the DN. Three solutions are described below.

In a first solution, a next-hop address resolution method is described in which a translation entry REQUEST message is sent through the network to determine the address of the destination node. In a second of the solutions, a translation entry REQUEST message is sent along with an SVC request to enable reverse SVC setup from the destination node in order to facilitate call processing. In the first and second solutions, the address of the voice interface control unit 24 associated with the destination node that serves the called number is stored at the originating voice interface control unit 24 and may be flooded to its peers in the same domain. In networks where the translation tables become too large, however, the preferred solution is to use next-hop routing with reverse SVC setup without a translation entry query. Each of these solutions are described below in some detail.

When a voice interface control unit 24 receives an STM call admission request, if the voice interface control unit 24 does not have a record in its DN translation table 38, 40 (FIG. 3) to determine an ATM destination node to service the call, the voice interface control unit 24 may use a type 3 REQUEST message to query other network nodes for the address. Before sending a type 3 request message, the voice interface control unit 24 at the originating node may be programmed to perform one of two options. The first option is to simply release the call back to the PSTN on the theory that locating the destination node will take too long to serve the call within an acceptable call setup delay. The PSTN can then route the call through its STM facilities. The second option is to set a time-out clock when the REQUEST message is formulated. If the time-out clock expires before a RESPONSE is received, the call is released back to the PSTN which routes the call through its STM facilities.

In either instance, a REQUEST message of type 3 (FIG. 2b) is formulated, and forwarded to the gateway node of the domain. If the domain has more than one gateway node, a type 3 message may be sent to each gateway, unless otherwise instructed by preconfigured information. On receipt of the type 3 message, the voice interface control unit 24 at the gateway node checks its translation table to determine whether it has knowledge of the termination node for the DN in question. If it cannot locate the DN in its translation tables, the gateway node adds its point code to the content object containing the PC stack, subtracts one from the TTL and forwards the REQUEST message to each peer in adjacent domains with which it has a control virtual circuit established. The gateway can also be configured with the next-hop routing resolution table respecting where to send a REQUEST message for a given DN, rather than sending a REQUEST message to every adjacent domain. A gateway can also be configured to discard a REQUEST message for certain DNs. This option may be used by network administration to control unnecessary flooding. When a peer gateway node receives the type 3 REQUEST message, it checks its translation tables to determine whether it has knowledge of the DN and, if so, responds with a type 3 RESPONSE (FIG. 2c). This chain continues until a gateway node has knowledge of the destination node to serve the DN. As the voice interface control unit 24 associated with each node receives the message, it checks the TTL. As described above, if the TTL is zero, the voice interface control unit 24 can respond to the message but not forward it. Before a message is forwarded, the voice interface control unit 24 deducts one from TTL and adds its point code to the PC stack. If its point code is already in the PC stack, the REQUEST message is discarded to prevent message looping. When a voice interface control unit 24 node having knowledge of the destination node to serve the call receives the message, it prepares a type 3 response message which it returns to the requesting voice interface control unit 24 using the data in the PC stack to route the message back to the origin. The PC stack is a last-in-first-out (LIFO) pop-up stack. Consequently, the response message will transverse a reverse order of the point codes in the stack. When the voice interface control unit 24 of the gateway in the originating domain receives the response message, it passes the message on to the voice interface control unit 24 associated with the originating node, and records the sequence ID from the message and the destination address of the RESPONSE message. If a subsequent RESPONSE message with the same sequence ID and destination address is received, that message is discarded. As the RESPONSE message is passed back to the originating node through the various gateway nodes, each gateway node may enter the translation query response data into its own translation tables. Each gateway node may also append its local DN list as a content object to the message. Each gateway may further optionally flood the translation query data to all other edge nodes in its domain using REQUEST type 2. If such flooding is practiced, it is preferable that a message delay clock be implemented in each voice interface control unit 24. The purpose of the delay clock is to prevent flooding for a predetermined period of time subsequent to a last flooding by the same voice interface control unit 24. This helps ensure that the control virtual circuits are not overloaded with flooding messages.

When a subsequent call to the same DN is received at the originating edge node or any other node to which the query data was flooded, an ATM SVC can be set up to the destination ATM node which is now in the translation table. Furthermore, if the voice interface control unit 24 associated with each gateway node is programmed to store the next-hop address for the DN, ISUP call control messages can be sent in ATM cells to the destination voice interface control unit 24 to permit the set up of an egress trunk path from the TDM peripheral 20 that serves the DN. This minimizes the amount of configuration required in the common channel signaling network for voice interface control units 24, since call control data is sent through the ATM network.

In order to conserve memory required for next-hop resolution routing tables which are used to route call control and address resolution massages, the voice interface control units at gateway switches need only save a next-hop address for any DN that is not served within that gateway's domain. A preferred structure for such a table is shown below in Table 1.

TABLE I

Gateway Next-Hop Resolution Routing Table

| DN | Next-Hop AESA | Next-Hop PC | Control VC |
|---|---|---|---|
| 913-547<br>... ... ... ... | A1 | P1 | VCx |

Figure 5:
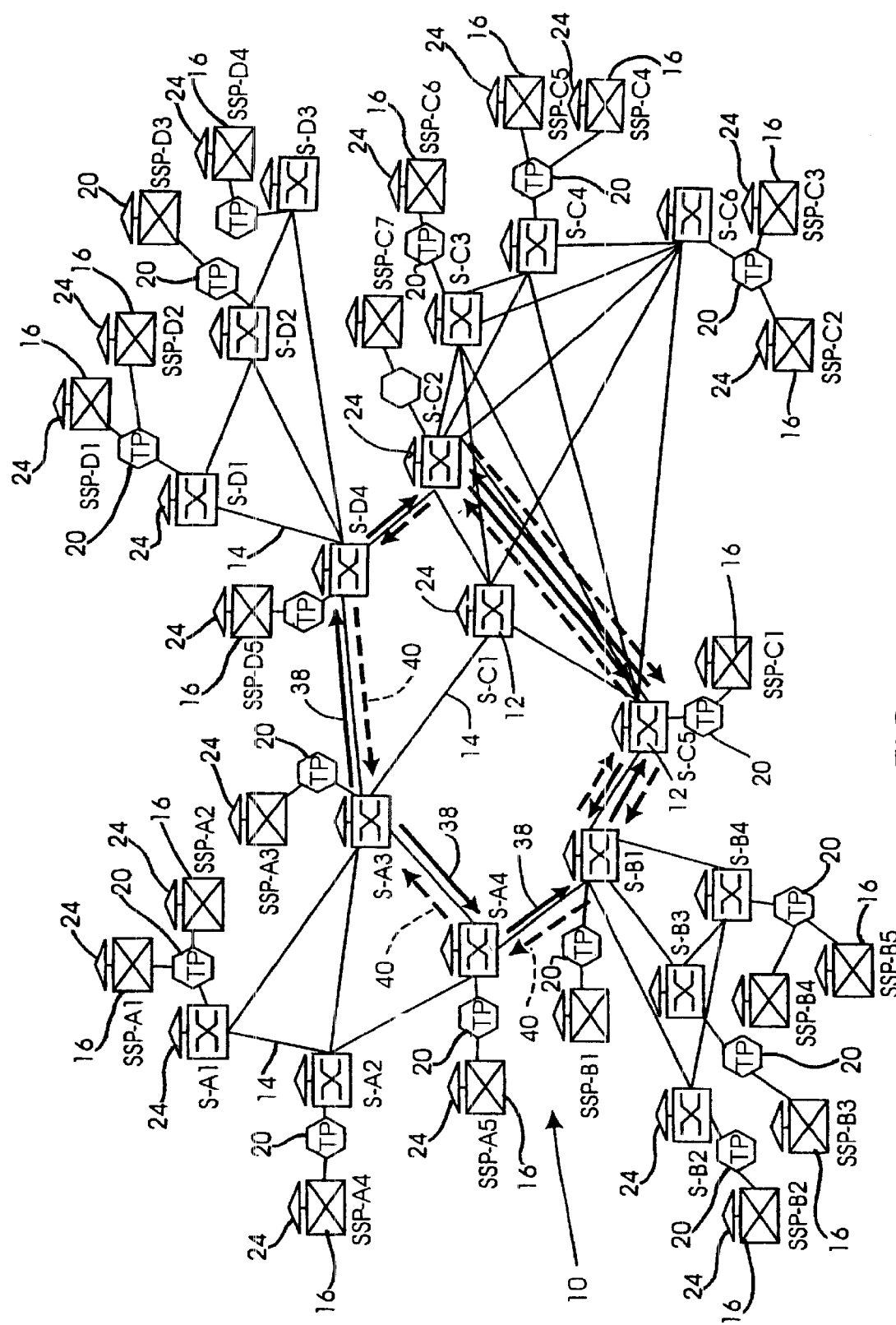
FIG. 5 is a schematic diagram of the processing of an inter-domain request for gateway translation entries using the messaging protocol in accordance with the invention.

In order to facilitate call control and address resolution message routing, an initialization procedure similar to that described above with reference to message types 1 and 2 can be used to permit gateway nodes to build their gateway next-hop resolution routing tables. Message type 3 is used for that purpose. As shown in FIG. 2c, a type 3 message is used for inter-domain request for next-hop resolution table entries. FIG. 5 schematically illustrates a type 3 message exchange which originates at the gateway node S-A3 which, for the sake of example, was recently designated a gateway node. In the message exchange shown in FIG. 5, the voice interface control unit 24 associated with gateway S-A3 formulates a type 3 REQUEST message which includes a content object of the type "group (gateway AESA, point code; domain DN list)", and forwards the message to its peer at S-D4. The gateway node S-A3 also forwards a copy of the message to its peer at S-A4 in the same domain. Each type 3 message has a TTL=4. As shown in FIG. 5, the message received by gateway S-A4 is subsequently forwarded to gateway S-B1.

Before forwarding the message, the gateway S-A4 examines the content objects for any information which it does not possess in its routing tables. Since the message originated in its own domain, it has all of the domain DN list owned by gateway S-A3 in its routing tables. Consequently, it simply adds its point code to the PC stack, adds a content object with its own "group (gateway ASEA, point code; domain DN list)", subtracts one from TTL and forwards the message. On receipt of the message, gateway S-B1 inspects the content objects of the message. Assume that gateway S-B1 already knows the domain DN list of gateway S-A4 and it is the shortest path to the domain of S-A4. Gateway S-B1 likewise simply adds a content object to the message with its domain DN list, adds its point code to the PC stack, subtracts one from the TTL and forwards the message to S-C5. For the sake of example, it is assumed that gateway S-C5 does not know the domain DN list of domain "A". When gateway S-C5 examines the content objects, it therefore copies the contents of the object added by gateway S-A4 after inspecting each of the content objects. Gateway S-C5 supplements the copied domain DN list with the next hop indicated as domain gateway S-B1 and a path length of two hops because gateway S-A4 is two hops away on this path. S-A4 was selected because it is two hops away, while S-A3 is three hops away. S-C5 then adds a content object with its own domain DN list, adds its point code to the original PC stack, subtracts one from TTL and forwards the message to S-C2. On receipt of the message, S-C2 inspects the content objects and adds the domain list of S-B1 and S-A4 to its next-hop resolution table because those DNs were, for the sake of example, unknown to that gateway. Gateway S-C2 with TTL equal to zero converts the REQUEST to a RESPONSE and returns the RESPONSE along the reverse path of the REQUEST as described above. In the RESPONSE message a record of the entire path is kept in the original PC stack and the PC stack is used to route the RESPONSE message along the same path back to the originating node. Each gateway node receiving the RESPONSE message examines the content objects attached to the RESPONSE to determine if they contain a new domain DN list or a shorter path for a known domain DN list in its next-hop resolution routing table. If so, it will update the table. As a result of this process, the next-hop resolution routing table in originating node S-A3 is updated with domain DN list information to permit it to route calls to DNs served by any of domains B, C and D using a shortest call control messaging path.

The REQUEST message sent by S-A3 to S-D4 is forwarded to S-C2, S-C5 and S-B1 in a similar procedure. Each gateway on the path updates its next-hop resolution routing table with any new domain DN lists or any shorter path. For DNs served by the domain 18b (FIG. 1), the gateway S-A3 determines, by inspecting the RESPONSE messages, that the preferred next-hop to the gateway S-B1 is through its peer gateway S-A4 whereas control messages for calls served by domain 18c are best routed to node S-C2 via node S-D4. The DNs received from gateway S-C2 are therefore stored in Table I with the next-hop address being the point code and AESA prefix of the gateway node S-D4. In domains A and C which have two gateways each, the gateways (S-C2, S-CS, for example) may be programmed to flood domain DN-list information to all other voice edge nodes in the domain to permit the voice interface control nodes 24 to build their DN routing tables to include shortest hop routes. Alternatively, system administrators may configure each voice edge node to send certain inter-domain call control and address resolution messages to a specific gateway.

Reverse SVC Setup

Figure 6:
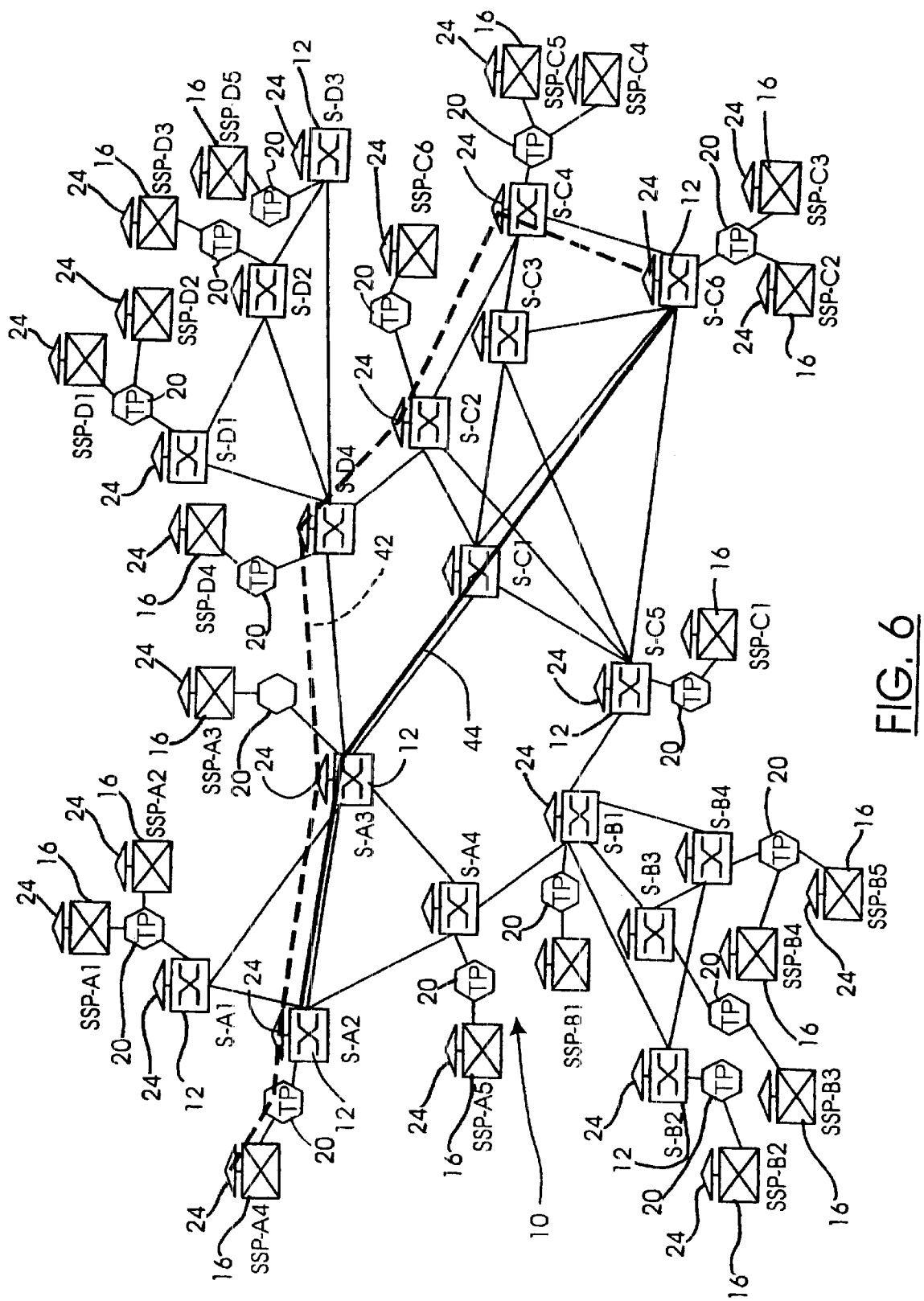
FIG. 6 is a schematic diagram illustrating a procedure for reverse switched virtual circuit setup using the methods and message protocol in accordance with the invention.

Once the next-hop address resolution table is built, it can be used to enable reverse SVC setup. Therefore, in order to ensure that a call admission request can be served with an acceptable delay, the preferred method of address resolution is to use a REQUEST message of type 5 or type 6 (FIG. 2c). Type 5 REQUEST messages include a content object which instructs reverse SVC setup from the destination node. FIG. 6 illustrates a signaling and SVC setup sequence using a REQUEST message of type 5. As shown in FIG. 6, a called admission request is received from SSP-A4 by the voice interface control unit 24 associated with ATM node S-A2. The voice interface control unit 24 associated with the ATM node S-A2 cannot locate the DN in its translation table. Its control program is instructed to formulate a type 5 REQUEST message under those circumstances. A type 5 REQUEST is therefore formulated and forwarded to the gateway node S-A3. The voice interface control unit at S-A3 consults its gateway routing table (Table 1) and determines that the next-hop for the dialled number is the gateway node S-D4. The voice interface control unit 24 at S-D4 consults its gateway routing table and determines that the next-hop is gateway node S-C2. The voice interface control unit at the gateway node S-C2 has knowledge of the terminating node that serves the DN because the DN is served by its domain. It consults its translation table and determines that the destination node is S-C6. Since all nodes in the domain are logically fully meshed, the gateway node S-C2 has a virtual control circuit to the destination node S-C6 and forwards the type 5 message to that node. On receipt of the message, the call interface control unit at destination node S-C6 examines the content objects and extracts the SVC request which includes the origination node address and a VCCI to be used for setting up an SVC to serve the call. The node S-C6 therefore sets up a SVC using ATM routing methods which select the shortest path through the originating node. The SVC is represented by the heavy black line 44 shown in FIG. 6. As may be seen, the SVC traverses the nodes S-C1 and S-A3 which is the shortest path to the originating node S-A2. On receipt of a CONNECT confirmation from S-A2 advising the destination node S-C6 that the SVC setup is complete, the destination node S-C6 forwards an IAM message to the destination PSTN. When the destination node S-C6 receives an ACM and an ANM from the destination PSTN, it returns a response message via the same path 42 indicated by the heavy dashed line to the voice interface control unit 24 at the node S-A2.

In accordance with this protocol, the REQUEST and RESPONSE messages replace corresponding ISUP SS7 messages. The REQUEST message replaces the ISUP IAM.

Figure 7:
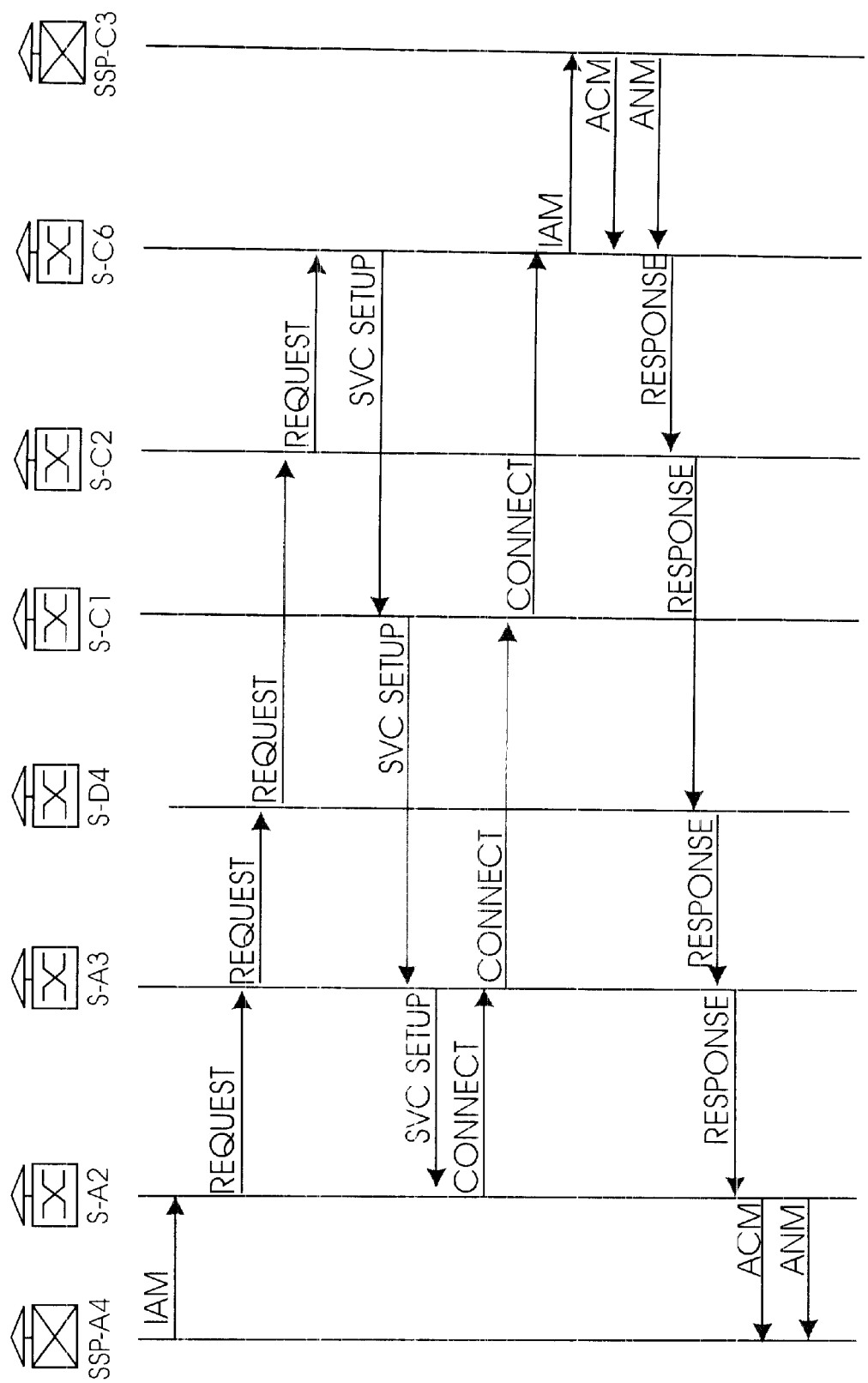
FIG. 7 is a schematic diagram of messages exchanged during the procedure shown in FIG. 6.

The ISUP IAM message can be encapsulated in a content object of the REQUEST message and sent to the destination voice interface control unit 24. The RESPONSE message replaces the ISUP ACM and ANM messages. Similarly, the ISUP ACM and ANM messages can be encapsulated in content objects of the RESPONSE message. Thus signaling load in the common channel signaling network is reduced and the number of signaling messages is minimized. FIG. 7 is a schematic diagram of the messages exchanged during the reverse SVC setup shown in FIG. 6.

The RESPONSE message shown in FIG. 6, includes DN translation data which may be stored by the originating node S-A2 and in intervening nodes (S-A3; S-D4). In very large networks, however, saving translation data for every DN could make translation tables too large and too complex for efficient operation.

The invention therefore provides a request message of type 6 which is used for next-hop routing REQUESTs with reverse SVC setup, without a translation entry query. The message type 6 permits call setups with reverse svc setup, as shown in FIGS. 6 and 7, without returning translation query data. In accordance with this solution, each voice interface control unit at edge nodes in each domain knows and maintains routing tables for its own DNs. Gateway nodes S-A3, S-A4, S-B1, S-C2, S-C5 and S-D4 each maintain next-hop routing tables, (Table 1). Call completion is accomplished using REQUEST messages of type 6 in which SVCs are set up in reverse from the destination node. This permits efficient call setup while minimizing translation table size and ensuring automated translation table maintenance. Call setup performance can be further improved by using cached SVCs for the reverse SVC setup to further improve SVC setup time.

Although the preferred embodiment of the invention has been described with reference to an ATM network as the broadband backbone for transferring voice and voice data calls, the methods of address resolution and call control messaging described above are equally applicable to the use of an IP network for the same purpose.

If the methods and apparatus are used for the transfer of voice and/or voice data over IP, each voice interface control unit is assigned an address which includes an IP address and a point code. The address field in all call control and address resolution messages is set to indicate the address type as "IP", as described above. The control VCs between voice interface control units are not currently supported by IP protocol, so REQUEST and RESPONSE messages, as well as call control messages are sent as connectionless service IP packets. Since all IP services are currently connectionless, the method of reverse SVC setup is not used. Nonetheless, the next-hop resolution routing table is built and maintained to indicate the next-hop IP address of a gateway voice interface control unit 24 to facilitate call setup using a shortest path. Call control messages are forwarded using that shortest path to a destination voice interface control unit to enable call egress setup to the PSTN.

If the IP network supports such protocols as RSVP or MPLS/LDP, which are known in the art, a path may be set up for the call. In that case, IP path setup can be done in a similar way to the reverse SVC setup described above. Alternatively, the call setup in the destination PSTN may be done before the path setup is completed in the IP network. On receipt of the REQUEST message, the destination IP edge node may immediately forward an IAM to the destination PSTN. After ACM and ANM messages are received from the destination PSTN, a RESPONSE message may be returned to the originating IP edge node to indicate the IP address of the destination edge node. Before the path is available, voice packets are forwarded using connectionless packets in the IP network.

The embodiments of the invention described above are exemplary only of implementations of the methods and messaging protocol in accordance with the invention. Changes and modifications of the embodiments described will no doubt become apparent to those skilled in the art. The invention is therefore intended to be limited solely by the scope of the appended claims.

We claim:

1. A method of address resolution for the transfer of synchronous transfer mode (STM) calls through multiple domains in an ATM network, comprising the steps of:

checking a called number translation table at an edge node in the ATM network which receives an admission request for the call to determine whether an address of an ATM destination node to serve the called number is known;

if the address is known, setting up a switched virtual circuit for transferring the call through the ATM network;

if the address is not known, formulating a query message at the edge node to determine the address of an ATM destination node that serves the called number;

forwarding the query message to at least one gateway node in a domain of the edge node in the ATM network, to request a translation of the called number to determine the address of the ATM destination node;

for a predefined number of hops, forwarding the query message to at least one other ATM node if a node receiving the query does not possess information to enable the translation; and starting a time-out clock when the query message is forwarded, and releasing the call back to STM facilities if a response to the query message is not received before the time-out clock has expired.

2. A method as claimed in claim 1 wherein the domains comprise a collection of edge nodes adapted to serve STM call admission requests, the edge nodes being logically fully meshed by control virtual circuits for call control and address resolution messaging.

3. A method as claimed in claim 2 wherein the gateway node has ATM virtual circuit established control messaging with a peer gateway node in an adjacent domain of the ATM network.

4. A method as claimed in claim 3 wherein the query message is sent to each gateway node in the domain of the edge node.

5. A method as claimed in claim 4 wherein the gateway node has a next-hop resolution routing table which provides a next hop node in a route for the called number and the gateway node forwards the query message to the next hop node if the called number is located in the routing table.

6. The method as claimed in claim 5 wherein the next-hop resolution routing table is automatically maintained by the gateway node which sends address resolution messages to neighbouring gateway nodes to request information used to maintain data in the table.

7. The method as claimed in claim 6 wherein the gateway node floods the next-hop resolution routing table data to all edge nodes in the ATM network.

8. A method as claimed in claim 5 wherein on receipt of the query message at a gateway node in a domain that serves the called number, the gateway node in that domain forwards the query message to the destination ATM node that serves the called number.

9. A method as claimed in claim 8 wherein the query message contains a switched virtual circuit (SVC) setup request and on receipt of the query message, the destination ATM node begins a backward setup of an SVC to the originating ATM edge node, the SVC being used for the call transfer.

10. A method as claimed in claim 9 wherein the SVC is set up by the ATM network using a shortest path method for SVC setup.

11. A method as claimed in claim 10 wherein the query message includes a point code (PC) stack which includes a PC for each node traversed by the query message and the PC stack is used to route a response message from the destination ATM node to the originating ATM edge node.

12. A method as claimed in claim 11 wherein the query message further includes a message type field.

13. A method as claimed in claim 12 wherein the message type field contains a value that indicates that a translation response is to be provided in response to the query message and the destination ATM node returns the translation response to provide the ATM edge node with a PC and AESA address of the destination ATM node.

14. A method as claimed in claim 13 wherein the called number is truncated to a minimum distinguishing number of digits before the translation response is returned by the destination ATM node.

15. A method as claimed in claim 13 wherein each node in the PC stack which is traversed by the translation response message records in its called number translation table the called number, PC and ASEA address of the ATM destination node that serves the called number.

16. A method as claimed in claim 15 wherein after recording the called number, PC and ASEA address of the ATM destination node that serves the called number, each ATM node traversed by the translation response floods the called number, PC and ASEA address to every other node in a same domain.

17. A method as claimed in claim 16 wherein each node traversed by the translation response includes a message control clock which determines a minimum elapsed time since the node last sent a translation flooding message before a first message can be sent to flood translation response information to other nodes in the same domain.

18. A method as claimed in claim 12 wherein the message type field contains a value that indicates that translation query data is not to be provided in response to the query message.

19. A method as claimed in claim 1 wherein if a translation query response message is received at the edge node, the edge node stores the called number, the PC and the ASEA address of the destination ATM node that serves the called number in its number translation table.

20. A method as claimed in claim 19 wherein the edge node floods the called number, the PC and the ASEA address of the destination ATM node that serves the called number to all other nodes in the same domain.

21. A method of address resolution for the transfer of synchronous transfer mode (STM) calls through multiple domains in an IP network, comprising the steps of:

checking a called number translation table at an edge node in the IP network which receives an admission request for the call to determine whether an address of an IP destination node to serve the called number is known;

if the address is known, sending IP packets to the destination node to set up egress of the call from the destination node to the STM network;

if the address is not known, formulating a query message at the edge node to determine the address of an IP destination node that serves the called number;

forwarding the query message to each gateway node in the domain of the edge node in the IP network to request a translation of the called number to determine the address of the IP destination node; and for a predefined number of hops, forwarding the query message to at least one other IP node if a node receiving the query does not possess information to enable the translation.

22. A method as claimed in claim 21 wherein the gateway node has a next hop resolution routing table which provides a next hop node in a route for the called number and the gateway node forwards the query message to the next hop node if the called number is located in the routing table.

23. A method as claimed in claim 22 wherein on receipt of the query message at a gateway node in a domain that serves the called number, the gateway node in that domain forwards the query message to the destination IP node that serves the called number.

24. A method as claimed in claim 23 wherein the query message includes a point code (PC) stack which includes a PC for each node traversed by the query message and the PC stack is used to route a response message from the destination IP node to the originating IP edge node.

25. A method as claimed in claim 24 wherein the query message further includes a message type field.

26. A method as claimed in claim 25 wherein the message type field contains a value that indicates that a translation response is to be provided in response to the query message and the destination IP node returns the translation response to provide the IP edge node with a PC and IP address of the destination IP node.

27. A method as claimed in claim 26 wherein the called number is truncated to a minimum distinguishing number of digits before the translation response is returned by the destination IP node.

28. A method as claimed in claim 27 wherein each node in the PC stack which is traversed by the translation response message records in its called number translation table the called number, PC and IP address of the IP destination node that serves the called number.

29. A method as claimed in claim 32 wherein each node traversed by the translation response includes a message control clock which determines a minimum elapsed time since the node last sent a flooding message before a first message can be sent to flood translation response information to other nodes in the same domain.

30. A method as claimed in claim 28 wherein if a translation query response message is received at the edge node, the edge node stores the called number, the PC and the IP address of the destination IP node that serves the called number in its number translation table.

31. A method as claimed in claim 30 wherein the edge node floods the called number, the PC and the IP address of the destination IP node that serves the called number to all other nodes in the same domain.

32. A method as claimed in claim 27 wherein after recording the called number, PC and IP address of the IP destination node that serves the called number, each IP node traversed by the translation response floods the called number, PC and IP address to every other node in a same domain.

33. A method as claimed in claim 25 wherein the message type field contains a value that indicates that translation query data is not to be provided in response to the query message.

34. A method as claimed in claim 23 wherein the query message contains an IP path reservation setup request and on receipt of the query message, the destination IP node begins a backward setup of a path to the originating IP node, the path being used for call packet transfer.

35. A method as claimed in claim 34 wherein an IAM message is sent to a destination PSTN network before a backward setup of a path is begun.

36. A method as claimed in claim 35 wherein connectionless IP voice packets are transferred through the IP network pending the IP path setup.

37. A method as claimed in claim 22 wherein the next hop resolution routing table is automatically maintained by the gateway node which sends address resolution messages to neighbouring gateway nodes to request information used to maintain data in the next hop resolution routing table.

38. A method as claimed in claim 37 wherein the gateway node floods the next hop resolution routing table data to all edge nodes in the same domain.

39. A method as claimed in claim 21 wherein a time-out clock is started when a query message is forwarded and the call is released back to STM facilities if a translation query response is not received in response to the query message before the time-out clock has expired.

* * * * *